United States Patent [19]

Kiuchi et al.

[11] Patent Number: 4,645,326
[45] Date of Patent: Feb. 24, 1987

[54] CAMERA WITH COMPUTER CIRCUIT

[75] Inventors: Masayoshi Kiuchi; Nobuyuki Suzuki, both of Kanagawa, Japan

[73] Assignee: Canon Kabushiki Kaisha, Tokyo, Japan

[21] Appl. No.: 868,891

[22] Filed: May 27, 1986

Related U.S. Application Data

[63] Continuation of Ser. No. 716,850, Mar. 28, 1985, abandoned.

[30] Foreign Application Priority Data

| Mar. 30, 1984 | [JP] | Japan | 59-64971 |
| Mar. 30, 1984 | [JP] | Japan | 59-64973 |
| Mar. 30, 1984 | [JP] | Japan | 59-64976 |
| Mar. 30, 1984 | [JP] | Japan | 59-64977 |
| Mar. 30, 1984 | [JP] | Japan | 59-64978 |

[51] Int. Cl.$^4$ .................. G03B 7/26; G06F 1/00
[52] U.S. Cl. ........................... 354/484; 364/900
[58] Field of Search ............ 354/412, 484, 468; 364/900; 377/66

[56] References Cited

U.S. PATENT DOCUMENTS 4,492,450  1/1985  Watanabe et al. .............. 354/412

Primary Examiner—William B. Perkey
Attorney, Agent, or Firm—Toren, McGeady and Goldberg

[57] ABSTRACT

Cameras of the kind having a computer circuit for control actions such as sequence control, etc. are arranged to render the computer circuit inoperative for prevention of an erroneous action in the event of a drop in the power supply voltage. However, in case that the voltage drop takes place during a data transfer process within the computer circuit, if the computer circuit is rendered inoperative immediately after the voltage drop, an erroneous data would be transferred to a memory circuit. Whereas, this invention provides arrangement to keep the computer circuit operative until completion of data transfer in the case of a voltage drop during the process of data transfer to the memory circuit.

19 Claims, 9 Drawing Figures

CAMERA WITH COMPUTER CIRCUIT

BACKGROUND OF THE INVENTION

1. Field of the Invention

This is a continuation of application Ser. No. 716,850, filed Mar. 28, 1985, now abandoned.

This invention relates to a camera of the kind having a microcomputer for control over photographing operations.

2. Description of the Prior Art

Cameras of the kind performing control over photographing operations with a microcomputer have been known. In the cameras of this kind, the data such as film sensitivity, preset values, etc. are transferred to a RAM. Photographing information is computed by a CPU on the basis of the data thus written into the RAM.

Generally, the computer is unable to have the data accurately written into the RAM if the power supply voltage is below a given value. This necessitates arrangement to detect the supply voltage to the computer and to inhibit data writing if the detected voltage is below the given value.

The camera uses a battery as a power source. The battery which is placed in a battery chamber is sometimes caused by external vibrations to be intermittently disconnected from its contact point. In that case, a temporary drop takes place in the voltage supplied to the computer. Therefore, with the above-stated arrangement to inhibit writing in case of a power supply voltage drop employed, it becomes hardly possible to have data accurately written into the RAM in the event of such a temporary voltage drop. After an occurrence of such inaccurate writing, the computer processes signals according to the erroneous data transferred to the RAM even when the voltage comes back to a normal level thereof.

In addition to the above-stated problem, another problem with the conventional cameras of the kind using a microcomputer lies in that: In processing data by transferring the data among a RAM, a ROM and a CPU, the processing time must be shortened. If not, a shutter chance would be missed as an excessively long time is required for actual sequence control, for example from a shutter release operation to the commencement of an exposure.

In a conceivable method for solving these problems, clock pulse frequency to be supplied to the computer is arranged to be high and a high voltage is applied to the computer. However, such arrangement results in a greater power consumption. Then, this brings about another problem in terms of the service life of the battery used for the camera which generally uses a dry element battery as a power source.

SUMMARY OF THE INVENTION

This invention is directed to the solution of the above-stated problems. It is, therefore, an object of this invention to provide a camera of the kind using a microcomputer for control actions, wherein, even in the event that the power supply voltage drops while data are being transferred between a RAM and a CPU, the computer is allowed to operate until completion of a data reading or writing process, so that processing of an erroneous data can be prevented even in the event of a voltage drop.

It is another object of the invention to provide a camera of the kind using a microcomputer for control actions, wherein the operating clock pulse frequency and/or voltage to be applied to the computer when data processing is not necessary is varied from the frequency and/or voltage to be applied to the computer when data processing is necessary. Therefore, power supply can be prevented from being wasted when no data processing operation is performed. The arrangement also permits a data processing operation to be performed at a high speed.

These and further objects and features of the invention will become apparent from the following detailed description of preferred embodiments thereof taken in connection with the accompanying drawings.

DETAILED DESCRIPTION OF THE PREFERRED EMBODIMENTS

Figure 1:
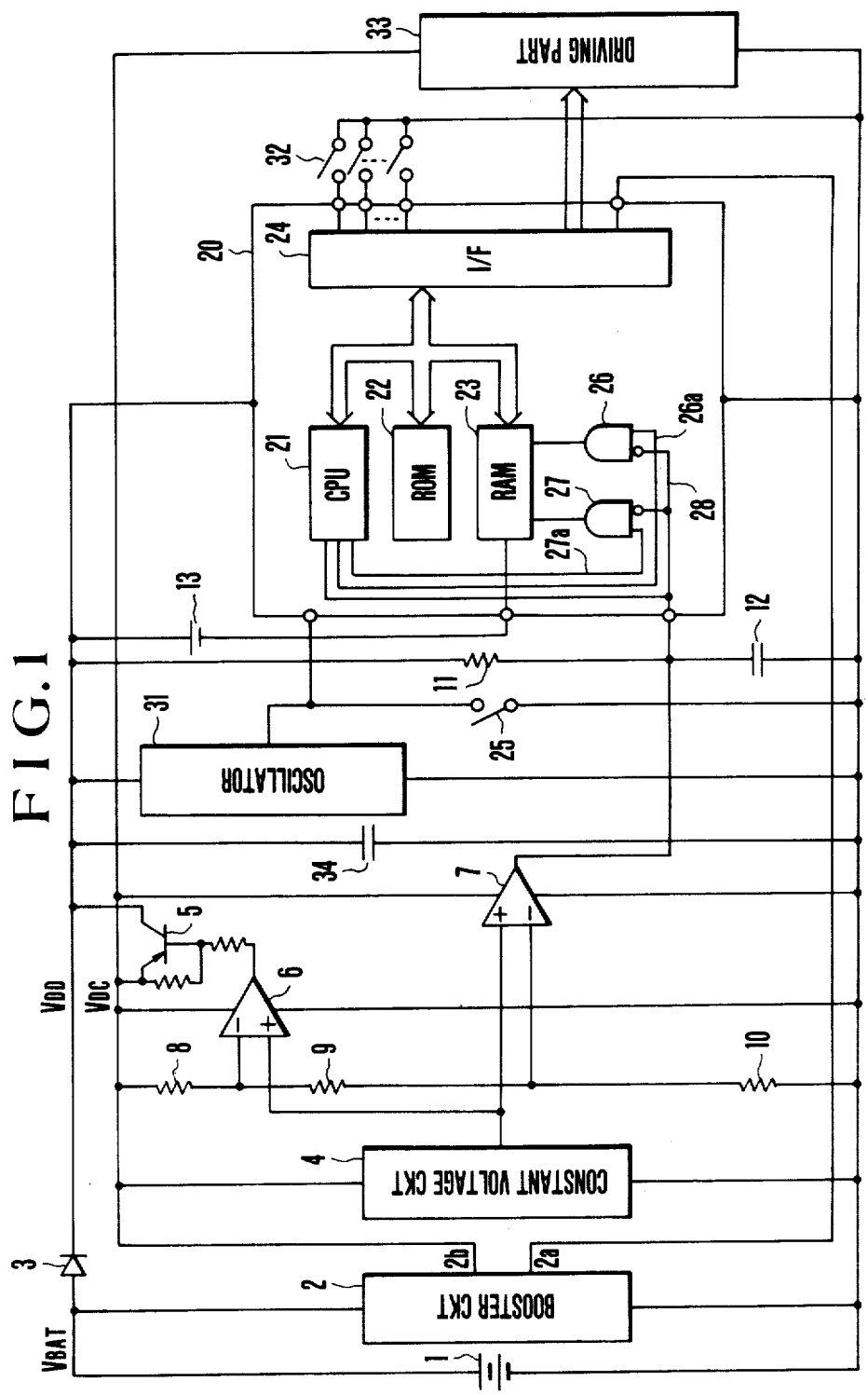
FIG. 1 is a circuit diagram showing, as an embodiment of this invention, a camera provided with a computer.

The details of this invention are as described below:

FIG. 1 shows in a circuit diagram a camera which is provided with a writing control circuit and is arranged as an embodiment of this invention. A power source battery 1 is placed in a battery chamber. Since the battery is directly connected to the circuit arrangement of the camera when it is set in place within the chamber, a microcomputer which will be described later is always supplied with an operating voltage from the battery. A booster circuit 2 is arranged to boost the output of the battery and is composed of a DC/DC converter. The converter is arranged to detect the level of a line 2a and to supply a boosted output to an output terminal 2b when the level of the line 2a is low. This line 2a is arranged to become a low level in response to an instruction from the microcomputer when a release operation member which will be described later is operated. A constant voltage circuit 4 is arranged to produce a predetermined voltage when the boosted voltage is impressed thereon. A power supply transistor 5 is arranged to have the boosted output supplied to a control circuit which is a one-chip microcomputer arranged in a manner as will be described later. Voltage dividing resistors 8, 9 and 10 are arranged to divide the boosted output. A comparator 6 is arranged to compare the voltage of a voltage dividing point between the resistors 8 and 9 with the output of the constant voltage circuit 4. The comparator 6 produces the output thereof at a high level (hereinafter will be called H for short) when the boosted output is found below a predetermined level or a first level and at a low level (hereinafter will be called L for short) when the boosting output is above the predetermined level.

A comparator 7 has an open collector on the output side thereof and is arranged to produce an L output when the output of the booster circuit 2 is higher than another predetermined level or a second level which is higher than the above-stated first level. The comparator 7 produces an H output as an inhibition signal when the level of the output of the booster circuit 2 is lower than the second level.

The circuit arrangement includes a pull-up resistor 11, a capacitor 12 which is arranged to absorb a pulsatile signal; and a backup battery 13 which is arranged to back up a RAM 23 incorporated in the microcomputer 20. With this arrangement, the contents of the RAM 23 can be kept unchanged in the event of a drop in the power supply.

The microcomputer 20 comprises, besides the above-stated RAM 23 (random-access memory), a ROM 22 (read-only memory); a CPU 21 (central processing unit) which has a variable clock; AND gates 26 and 27 which form a transfer circuit for controlling writing and reading to and from the above-stated ROM 22 and RAM 23; and an interface circuit 24. Within the microcomputer 20, there is provided a line 27a for transmitting a writing signal (H) from the CPU 21 to the gate 27. In response to this H signal, the gate 27 renders the RAM 23 accessible to permit a data writing action on the RAM 23. Another line 26a is provided for transmitting a reading signal (H) from CPU 21 to the above-stated gate 26. In response to that H signal, the gate 26 produces an H output to render the RAM 23 accessible to enable the CPU 21 to perform reading from the ROM 22 or from RAM 23.

A switch 25 is arranged to turn off when the battery 1 is set in position within the battery chamber. With the switch 25 turned off, an oscillator 31 and the microcomputer 20 are released from their reset states.

A reference numeral 32 denotes a switch group which are arranged to detect interlocked operating states in response to the operations of the operation members such as a shutter release button, a film sensitivity setting operation member, a film winding operation detecting member, etc. The conditions or positions of these switches 32 are read into the microcomputer via the interface circuit 24. A driving circuit 33 is arranged to drive the various elements of the camera which are not shown but include, for example, a release magnet, a shutter control magnet, a display device, a film winding motor, etc. in response to instructions from the microcomputer 20.

A backup capacitor 34 is arranged to back up the microcomputer 20 and the oscillator 31. Next, the operation of the embodiment shown in FIG. 1 is as follows:

When the battery 1 is placed in the battery chamber, a voltage VDD which is produced from the battery 1 is impressed on the microcomputer 20 and the oscillator 31 via a diode 3. As mentioned above, the switch 25 is off when the battery is in the battery chamber. Under this condition, the computer 20 and the oscillator 31 are released from their reset states. Therefore, the oscillator 31 supplies clock pulses to the computer 20. The microcomputer then operates according to a program contained within the ROM 22. Since the contents of the program are not directly related to this invention, the details of the program are omitted from description here. This program causes the microcomputer 20 to detect the condition of the switch group 32 which is responsive to the operation of a power supply switch and is arranged to render the booster circuit 2 operative by making the level of the line 2a L. As a result of this, the boosted output of the driving circuit 33 is impressed. The computer 20 detects the boosted output by means of resistors 8–10 and makes the output level of the comparator 6 L. The transistor 5 is turned on to have the output of the booster circuit 2 impressed on the oscillator 31 and on the computer 20 in place of the output of the battery 1. After that, the computer 20 detects a predetermined condition of the switch group 32 which is responsive to a depressing operation on the release button. With this condition detected, a signal indicative of the depression of the release button is transmitted to the CPU 21 via the interface circuit 24. Thus, with the release button depressed, a photometric computing operation is carried out. Then, a magnet which is arranged to cause the mechanism of the camera to operate is actuated. The leading curtain of a shutter travels to initiate an exposure. Following this, after the lapse of a shutter time corresponding to the results of the above-stated computation, the trailing curtain of the shutter is allowed to travel with a magnet which is provided for that purpose actuated by the driving circuit 33. The microcomputer 20 detects the end of the exposure through the switch group 32 and transmits this to the CPU 21 via the interface circuit 24. The driving circuit 33 then drives a shutter charging motor to bring one sequence of photographing processes to an end with film winding performed.

A program for controlling a photographing sequence of processes is thus stored within the ROM 22. Photographing control is accomplished in accordance with this program. In the sequence control over the photographing operation, the microcomputer 20 further operates according to the program in the following manner: With a film sensitivity value set by the operation of one of the switch group 32 which is responsive to a film sensitivity setting member, the above-stated computing operation is performed on the basis of the set film sensitivity value to obtain a shutter time value from a digital value obtained by analog-to-digital converting the output of a photometric circuit which is not shown and also from a preset aperture value as well as the above-stated preset film sensitivity value. The microcomputer 20 further performs, according to the program, a stepwise advancing operation on a film counter in relation to film winding. These computing and stepwise advancing operations are accomplished with data transferred between the RAM 23 and the CPU 21. For example, information on the film sensitivity is detected by the CPU from the operating condition of the film sensitivity setting switch of the switch group 32. The film sensitivity information is sent out from the CPU 21 to the line 27a at an H level. A writing signal (H) is supplied from the gate 27 to the RAM 23 to render the RAM 23 accessible. While the above-stated setting switch is in operation, the film sensitivity information is shifted stepwise from one value to another in the form of a digital value. The digital value is renewed by the CPU 21 according to the program. The digital value is transferred to the RAM 23. The microcomputer 20 also detects the preset aperture value from the operating condition of an aperture setting switch of the switch group 32. The detected preset aperture value is also likewise written into the RAM 23.

With data on the film sensitivity value and the aperture value having been written into the RAM 23 in this manner, when the above-stated release operation member is operated, an H signal is produced from the line 26a of the CPU 21. The gate 26 produces a reading signal (H) to have the data read out from the RAM 23 and supplied to the CPU 21. The CPU 21 then performs an exposure computing operation as follows: Sv (a film sensitivity data)+Bv (a luminance data)−Av (an aperture data)=Tv (a shutter time data). The luminance data Bv is a photometric output obtained through analog-to-digital conversion performed by an A-D converter. This data is also written in the RAM 23 in the same manner as mentioned in the foregoing. The result of the computing operation is produced at an H level from the line 27a and is again written into the RAM 23. The above-stated computing operation is carried out through data transfer between the RAM 23 and the CPU 21 according to the program. With regard to the stepwise advancing operation on the film counter, the end of film winding by a motor is detected by applicable one of the switch group 32. An H signal is then produced from the line 26a of the CPU 21. The gate 26 produces a reading signal at H. The data (on the previous film count) of the RAM 23 is then transferred to the CPU 21. The CPU 21 adds 1 to the transferred data. After that, an H output of the CPU 21 is produced from the line 27a. The data obtained with 1 added thereto is thus transferred to the RAM 23. Thus, the content of the RAM 23 increases by 1 every time a film winding operation is performed. The stepwise advancing operation on the film counter is thus carried out with data transfer carried out between the RAM 23 and the CPU 21 in this manner according to the program.

With the camera thus arranged to have sequence control performed by the microcomputer 20, data of varied kinds are transferred to the RAM 23; and the computing operation, etc. are accomplished on the basis of the data transferred to the RAM 23. Therefore, the data writing and reading operation to and from the RAM 23 must be always accurately performed.

Generally, in order to ensure accurate data writing and reading to and from the RAM 23, a voltage higher than a minimum operating voltage (the above-stated second level which is a writing and reading guaranteeing voltage) must be supplied to the microcomputer 20. To meet this requirement, in accordance with this invention, the comparator 7 is arranged to detect a boosted voltage and to produce an L level output therefrom only when the voltage supplied to the computer 20 is higher than the above-stated second level. With regard to instruction signals for writing and reading, the gates 26 and 27 are arranged to have the writing or reading signal (H) applied to the RAM only in case where the boosted output is above the second level when H outputs are produced from CPU 21 to the lines 27a and 26a. The writing and reading operations are allowed only when the computer 20 has a sufficient supply voltage. The arrangement, therefore, ensures an accurate data writing operation on the RAM 23.

However, in accordance with such arrangement, the above-stated writing operation is inhibited, for example, in cases where the output of the comparator 7 is temporarily shifted from L to H with the battery which is disposed in the battery chamber temporarily disconnected from a contact point by some external vibration or with the boosted output temporality lowered by load driving. Therefore, in the event of such a temporary drop in the voltage supplied to the computer 20, the data cannot be accurately transferred to the RAM 23 or from the RAM 23 to the CPU and then an erroneous data would be written in or read out.

Therefore, when the boosted output soon comes back to a level above the second level after the momentary drop of the boosted output, the computer still operates on the basis of the erroneous data. To avoid this inconvenience, in the case of this invention, an absorption circuit which consists of a resistor 11 and a capacitor 12 is inserted in the line 28. In the event of a momentary H level of the output of the comparator 7, the line 28 is thus kept at L which is below the threshold level of the gates 26 and 27 over a length of time during which the capacitor 12 is charged. This circuit thus absorbs a short pulsative noise and is capable of preventing the gates 27 and 26 from responding to the momentarily change of L→H→L in the output of the comparator 7, so that data writing or reading can be prevented from being inhibited during a writing or reading operation.

Further, in the event of the above-stated temporary drop in the boosted output, the operating voltage applied from the booster circuit 2 to the microcomputer 20 via the transistor 5 also temporarily lowers. However, during this period, the backup voltage with which the capacitor 34 has been charged is applied to the computer 20 and, at the same time, a backup battery 13 applies a voltage to the RAM 23. Further, since the computer operation guaranteeing voltage is lower than the above-stated second level as mentioned in the foregoing, the capacitor 34 supplies the computer 20 with a voltage higher than the operation guaranteeing voltage over a period during which a temporary drop takes place also in the operating voltage supplied to the computer 20. The data writing operation on the RAM 23, therefore, remains unaffected by the drop in the boosted output supplied to the computer 20.

In this embodiment, as mentioned in the foregoing, there is provided the absorption circuit for absorbing any momentary writing or reading inhibition signal that is brought about by a temporary voltage drop in the supply voltage to the computer 20 during the process of data writing or data reading to or from the RAM 23. Therefore, data transfer can be always accurately performed without being affected by a temporary drop in the voltage supplied to the computer 20.

Further, the absorption circuit not only absorbs a temporary signal change due to the above-stated temporary voltage drop but also is capable of absorbing external noises coming to the line 28 (such as motor noises and radio waves), so that these external noises can be likewise prevented.

Meanwhile, when the battery 1 is replaced with a new battery in the embodiment shown in FIG. 1, a low level signal is transmitted to the line 28 during a period of time required for charging the capacitor 12. Then, despite of that the voltage applied to the computer 20 is not sufficiently high, the above-stated writing operation might be prematurely allowed to have an erroneous data written into the RAM 23. However, the camera does not require any high speed processing operation, such as a computing or load driving operation, before a shutter release operation. Therefore, in controlling the camera with the computer 20, the control operation can be performed at a relatively slow speed before the release operation. It is advantageous in terms of power consumption, therefore, to have a voltage impressed on the computer 20 from a power source which produces a relatively low output before the release operation and to raise the impressed voltage for a high speed processing operation after the release operation is performed. It is, therefore, preferable to have the voltage impressed on the computer 20 from the battery 1 before the release operation and to actuate the booster circuit 2, after the release operation, to have the boosted output of the circuit 2 applied to the computer 20.

However, in the event that a drop in the voltage of the battery 1 happens during the process of a sequence of photographing operations of the camera after a shutter release operation and that the battery is replaced under that condition, the rest of the sequence of operations must be allowed to be carried out after the battery is replaced. In that event, the micro computer 20 must be driven at a high speed without delay. In view of this, the camera must be arranged to have the booster circuit 2 actuated immediately after the battery is replaced.

In such a case, a considerably long period of time is required before the output of the booster circuit 2 reaches a predetermined voltage after replacement of the battery as mentioned above. During this period, therefore, the comparator 7 produces an inhibition signal at a high level to prevent thereby the transfer of an erroneous data to the RAM 23 with a writing operation performed by the computer 20.

Meanwhile, upon completion of battery replacement, the absorption circuit which is arranged as described above begins to charge the capacitor 12. Therefore, despite of the inhibition signal from the comparator 7, the absorption circuit causes the line 28 to be at a low level for a predetermined length of time required for charging. Accordingly, the writing inhibition signal from the line 28 is not transmitted to the computer 20 thus permitting a writing operation although the voltage applied to the computer 20 is not sufficiently high after the battery replacement. Therefore, at the time of battery replacement, an erroneous data might be transferred to the RAM.

Figure 2:
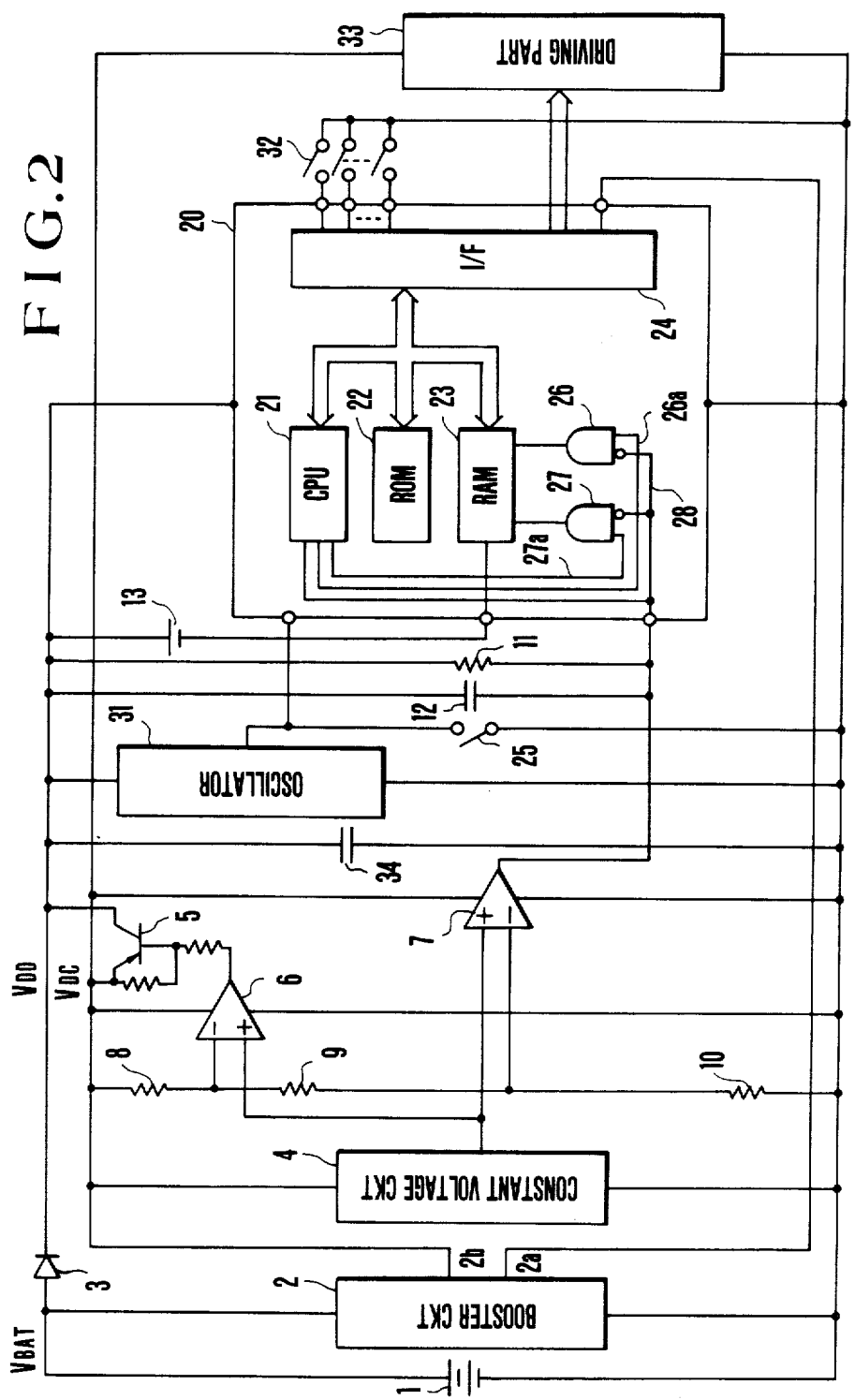
FIG. 2 is a circuit diagram showing, as another embodiment of this invention, a camera provided with a computer.

To solve this problem, another embodiment of this invention is arranged as shown in FIG. 2. Referring to FIG. 2, in an electronic apparatus having a computer arranged to control the operation thereof, there is provided a detection circuit which is arranged to detect a voltage applied to the computer. When the voltage is below a predetermined level, the detection circuit produces an inhibiting signal for inhibiting the data writing or reading operation of the computer. An absorption circuit consisting of a parallel arrangement of a capacitor and a resistor is connected between the above-stated detection circuit and a power supply line arranged for applying the voltage to the computer. The output of the detection circuit is arranged to be supplied to the computer via the absorption circuit. This arrangement inhibits any erroneous data from being written in or read out in the event of a temporary drop in the voltage supplied to the computer or in case of battery replacement. Further referring to FIG. 2, the components which are identical with those shown in FIG. 1 are indicated by the same reference numerals. This embodiment differs from the embodiment shown in FIG. 1 in that the capacitor 12 which forms the absorption circuit is parallel connected to the resistor 11. The level of a line 2a becomes a low level in response to an instruction produced from the microcomputer 20 when the release operation member is operated. The level of the line 2a is arranged to become low also in response to an instruction of the microcomputer 20 produced in the event of replacement of the battery.

The embodiment shown in FIG. 2 operates as follows: The normal operation of this embodiment is exactly the same as in the embodiment is exactly the same as in the embodiment shown in FIG. 1. The sequence of photographing operations are controlled and the data writing and reading to and from the RAM 23 are performed in the same manner as described in the foregoing. Therefore, description of the normal operation of this embodiment is omitted here. However, in the event that the battery 1 within the battery chamber is momentarily disengaged from a contact point or the boosted output temporarily drops due to load driving during the process of a data writing operation on the RAM 23, the embodiment operates in the following manner: In the case of this embodiment, since the capacitor 12 is connected between the output terminal of the comparator 7 and the line VDD, the capacitor 12 is charged when the output level of the comparator 7 is L, i.e. when the booster output is above the above-stated second level. When the output level of the comparator 7 momentarily shifts from L to H, the accumulated electric charge of the capacitor 12 is discharged via resistor 11 as the output of the comparator 7 is arranged to be an open collector output. Accordingly, even with the output level of the comparator 7 having shifted to H, the level of the line 28 which is determined by the time of the above-stated discharge does not come to exceed the threshold level of the gates 27 and 26 to allow these gates to continuously produced their outputs at H as a writing or reading signal.

Therefore, the writing or reading operation is not inhibited even in the event of a momentary change of the output of comparator 7 which takes place in the manner of L→H→L during the process of writing or reading to or from the RAM 23. Thus, the writing or reading operation is accurately carried out even in that event, so that the above-stated inconvenience can be effectively prevented.

Further, the above-stated parallel arrangement of the capacitor 12 and the resistor 11 is disposed between the power supply line VDD and the comparator 7. Therefore, the level of the line 28 becomes the same as the voltage of the power supply line VDD, i.e. becomes H, immediately after battery replacement and thus inhibits writing and reading by the computer 20. Thus, unlike the above-stated embodiment of FIG. 1 arranged to absorb the temporary change of L→H→L by having the resistor 11 connected between the ouput terminal of the comparator 7 and the power supply line 28 and having the capacitor 12 disposed between the output terminal of the comparator 7 and a ground line, this embodiment is capable of preventing a premature writing operation from being allowed while the boosted output is still insufficient after battery replacement.

After battery replacement, the booster circuit 2 begins to operate and when its output comes back to a level higher than the above-stated second level, the comparator 7 produces an L output. Then, after that, the computer 20 is allowed to write, so that data writing can be accurately performed.

In accordance with the arrangement of this embodiment, as described above, data processing can be always accurately carried out as no erroneous data writing operation is allowed on the RAM 23 in the event of a temporary drop in the voltage applied to the computer 20 or when the battery is replaced.

The erroneous data writing at the time of battery replacement is caused not only by actuation of the booster circuit 2 at that time but also by power supply effected directly to the computer 20, because: The backup capacitor 34 is charged for a predetermined period of time after battery replacement even when power supply is effected directly to the computer 20 from the battery 1 and, during this charging period, the output of the battery 1 becomes lower than the above-stated second level. Therefore, with the absorbing circuit provided as shown in FIG. 1, the computer 20 might make erroneous data writing despite of the arrangement of the comparator 7 to detect the output of the battery 1 and to produce an H output to inhibit writing during the above-stated period. Whereas, this embodiment is arranged to inhibit any writing operation even in that instance until the voltage applied to the computer 20 comes to exceed the second level. The embodiment thus ensures accurate data writing.

Figure 3:
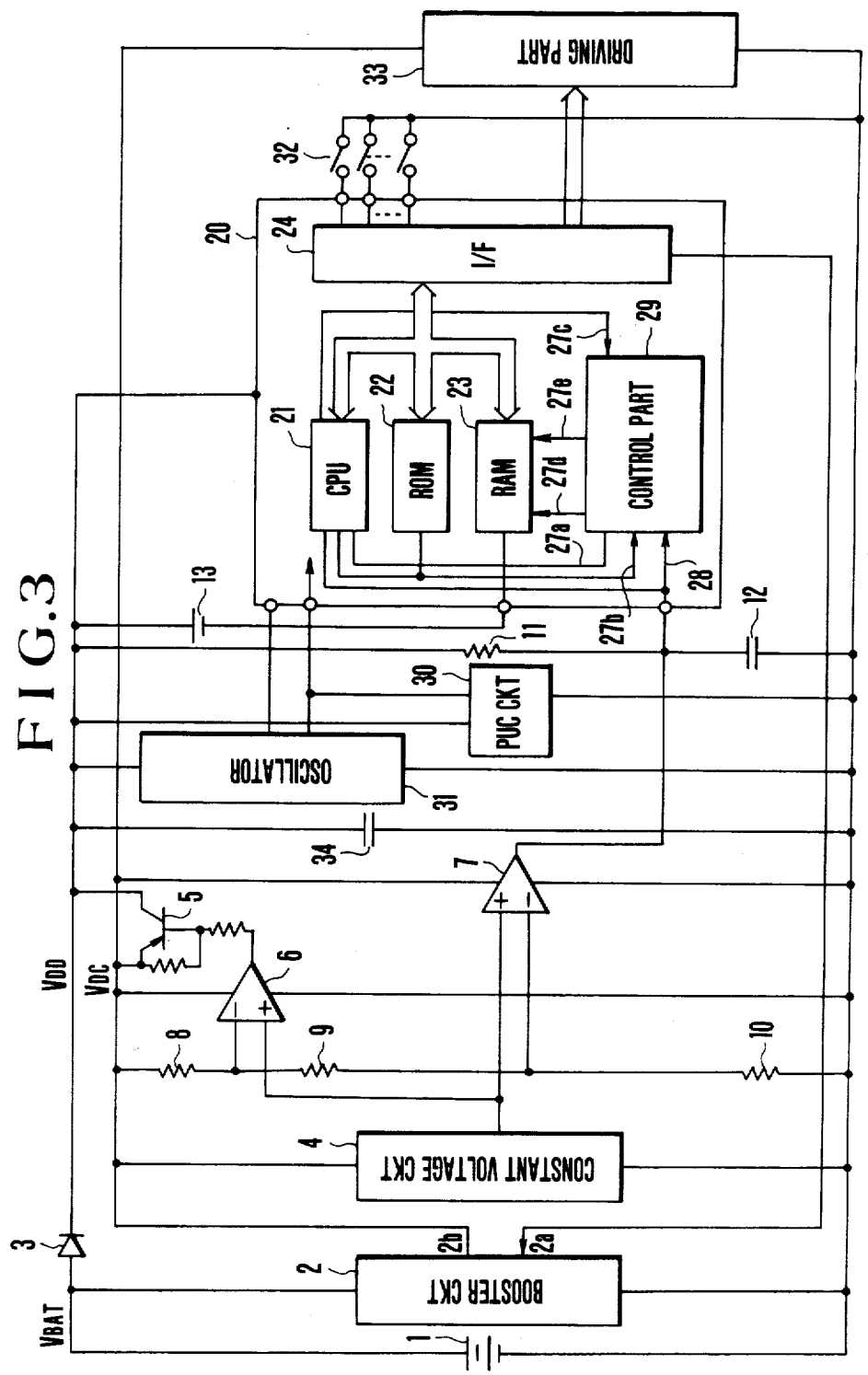
FIG. 3 is a circuit diagram showing a further embodiment of this invention.

FIG. 3 is a circuit diagram showing a further embodiment example of this invention. The same components as those shown in FIG. 1 are indicated by the same reference numerals. The embodiment is provided with a control part 29 which controls writing and reading operations on a ROM 22 and a RAM 23. A line 27c is arranged to provide the control part 29 with a pulse every time one step of a program is carried out by a CPU. In response to this pulse, the control part 29 takes therein the output state of the line 28 which is mentioned in the foregoing.

Figure 4:
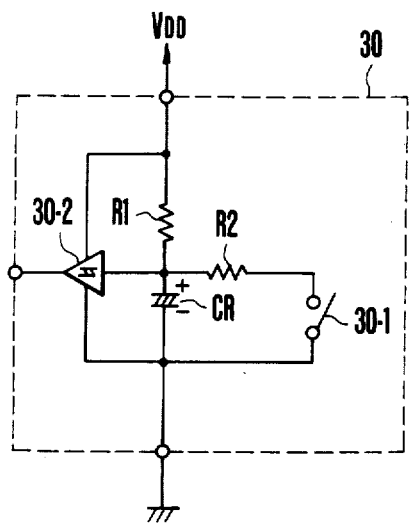
FIG. 4 is a circuit diagram showing a power-up-clear circuit of the embodiment shown in FIG. 3.

A power-up-clear (PUC) circuit 30 is arranged to have an oscillator 31 and a computer 20 released from their reset states in response to an H output produced from the circurt 30. FIG. 4 shows in a circuit diagram the details of arrangement of the power-up-clear circuit 30 shown in FIG. 3. Referring to FIG. 4, the circuit 30 includes resistors R1 and R2; a capacitor CR; a switch 30-1 which turns on when the battery 1 is not placed within the battery chamber and turns off when the battery 1 is placed there; and a comparator 30-2 which possesses a predetermined hysteresis.

With the power-up-clear circuit 30 arranged in this manner, the electric charge of the capacitor CR is discharged via the switch 30-1 when the battery 1 is not placed within the battery chamber. The capacitor CR is charged with a current coming from the voltage VDD via the resistor Rl when the battery 1 is placed there. When the electric charge of the capacitor CR reaches a predetermined voltage, the output level of the comparator 30-2 becomes H to release the oscillator 31 and the microcomputer 20 from their reset states.

Figure 5:
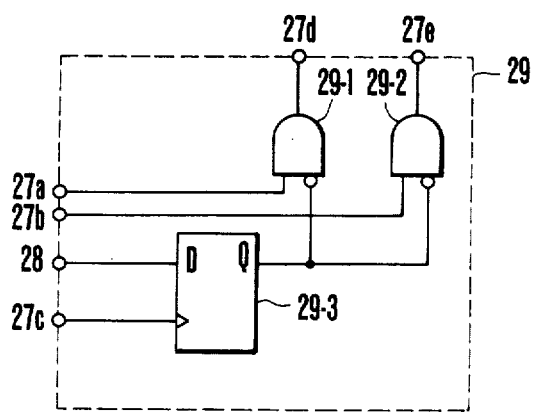
FIG. 5 is a circuit diagram showing by way of example the arrangement of a control circuit of the embodiment shown in FIG. 3.

FIG. 5 shows by way of example the circuit arrangement of the control part 29 shown in FIG. 3. In the control part 29, a D type flip-flop 29-3 (hereinafter will be called DFF for short) has its D input terminal connected to the above-stated line 28 and its clock terminal connected to the line 27c. AND gates 29-1 and 29-2 respectively have one of their input terminals connected to the lines 27a and 27b and the other of their input terminals connected to the Q output terminal of the DFF 29-3 via inverters. With the control part 29 arranged in this manner, the Q output level of the DFF 29-3 becomes L when the signal of the line 28 is L. Then, in response to writing and reading signals supplied to the lines 27a and 27b, the AND gates 29-1 and 29-2 produce H outputs to the lines 27d and 27e to have them transmitted to the RAM 23. Writing and reading operations are thus allowed to be carried out. When the level of the signal of the line 28 shifts from L to H, the DFF 29-3 makes the level of the Q output thereof H in synchronism with the pulse supplied to the line 27c every time one step of the program is carried out. The H level Q output of the DFF 29-3 causes the signals of the lines 27d and 27e to be at L. Therefore, even when the level of the signal of the line 28 becomes H during the process of writing or reading, the writing or reading operation is allowed to be carried out until the program step for that operation come to an end. Data transfer to the RAM 23, therefore, can be carried out without fail even in the event of a voltage drop during the writing operation.

The embodiment of this invention shown in FIGS. 3, 4 and 5 operates as follows: Assuming that the battery 1 is placed within the battery chamber, the output voltage of the batrery 1 is applied via the diode 3 to the microcomputer 20, the oscillator 31 and the power-up-clear circuit 30. The switch 30-1 of the circuit 30 is off when the battery is in the battery chamber as mentioned above. The comparator 30-2 is producing an H output. Therefore, the computer 20 and the oscillator 31 are released from their reset states. The oscillator 31 thus supplies clock pulses to the microcomputer 20. This renders the microcomputer 20 operative. The computer 20 operates according to the program contained in the ROM 22.

The series of sequence control operations according to the program are as described in the foregoing with reference to FIG. 1 and, therefore, are omitted from the following description. During the sequence control, if the output level of the booster circuit 2 is caused to drop to temporarily become lower than the above-stated second level due to some displacement of the battery within the battery chamber, for example, while a data is being written into the RAM 23 with an H output produced from the CPU 21, the comparator 7 changes its output level from L to H. The H output of the comparator 7 is transmitted via the line 28 to the D input terminal of the DFF 29-3. The clock terminal of the DFF 29-3 is connected to the line 27c while the line 27c is receiving a pulse every time one step of the program is carried out as mentioned in the foregoing. Therefore, even with the level of the signal of the line 28 coming to shift from L to H during the writing operation (or at a writing step), the DFF 29-3 retains the level of its Q output at L without responding to the signal of the line 28 until completion of the writing step. Accordingly, the gate 29-1 keeps on producing an H level output through the line 27d to keep the RAM 23 in a accessible state even when the level of the boosted output becomes low. Thus the data writing operation is accurately carried out in the event of a momentary drop in the boosted output during the writing process.

Further, in this instance, the voltage applied from the booster circuit 2 via the transistor 5 to the microcomputer 20 also temporarily drops. However, during this period of voltage drop, the back-up voltage with which the capacitor 34 is charged is applied to the computer 20 while the backup battery 13 applies a voltage to the RAM 23. Besides, the computer 20 is capable of operating when the operating voltage thereof is lower than a voltage required for writing. The computer 20, therefore, remains operative to have a data writing operation accurately performed on the RAM even when the operating voltage supplied to the computer 20 is temporarily changed by a temporary drop in the boosted output.

Further, when the power source battery 1 is displaced temporarily by some vibration or the like as mentioned in the foregoing, the reset switch 30-1 turns on. However, the microcomputer 20 and the oscillator 31 are arranged to be not reset before the output level of the comparator 30-2 changes from H to L with the electric charge of the capacitor CR discharged by the resistor R2. The length of time before this change of the output level of the comparator 30-2 is arranged to be sufficiently long for data transfer between the CPU 21 and the RAM 23. Therefore, even when the reset switch 30-1 is turned on by the temporary displacement of the power source battery 1 due to vibrations or the like, a resetting action is performed after completion of the data writing operation of the CPU 21 on the RAM 23. The resetting action thus never be performed during the data writing operation of the CPU 21 on the RAM 23. The possibility of erroneous data writing is thus completely precluded. Further, the transistor 5 turns off with the output level of the comparator 6 changed when the voltage becomes lower than the first level mentioned in the foregoing after the switch 30-1 turns on to lower the voltage. With the transistor 5 thus turned off, the power supply voltage VDD comes to be supplied from the capacitor 34 to the computer 20 and the oscillator 31.

In this embodiment, as described above, the RAM 23 is kept accessible until completion of a writing instruction step even in the event of an occurrence of a power supply drop during a data writing operation on the RAM 23; and the power-up-clear circuit 30 is arranged to reset the oscillator 31 and the computer 20 after completion of the above-stated step with the switch 30-1 turned on. The embodiment thus ensures accurate data transfer to the RAM 23 even in the above-stated event.

The RAM 23 is arranged to be accessible also for the reading operation in the same manner as described above. Therefore, a data reading operation also can be accurately accomplished even in the event of a drop in the power supply output.

Figure 6:
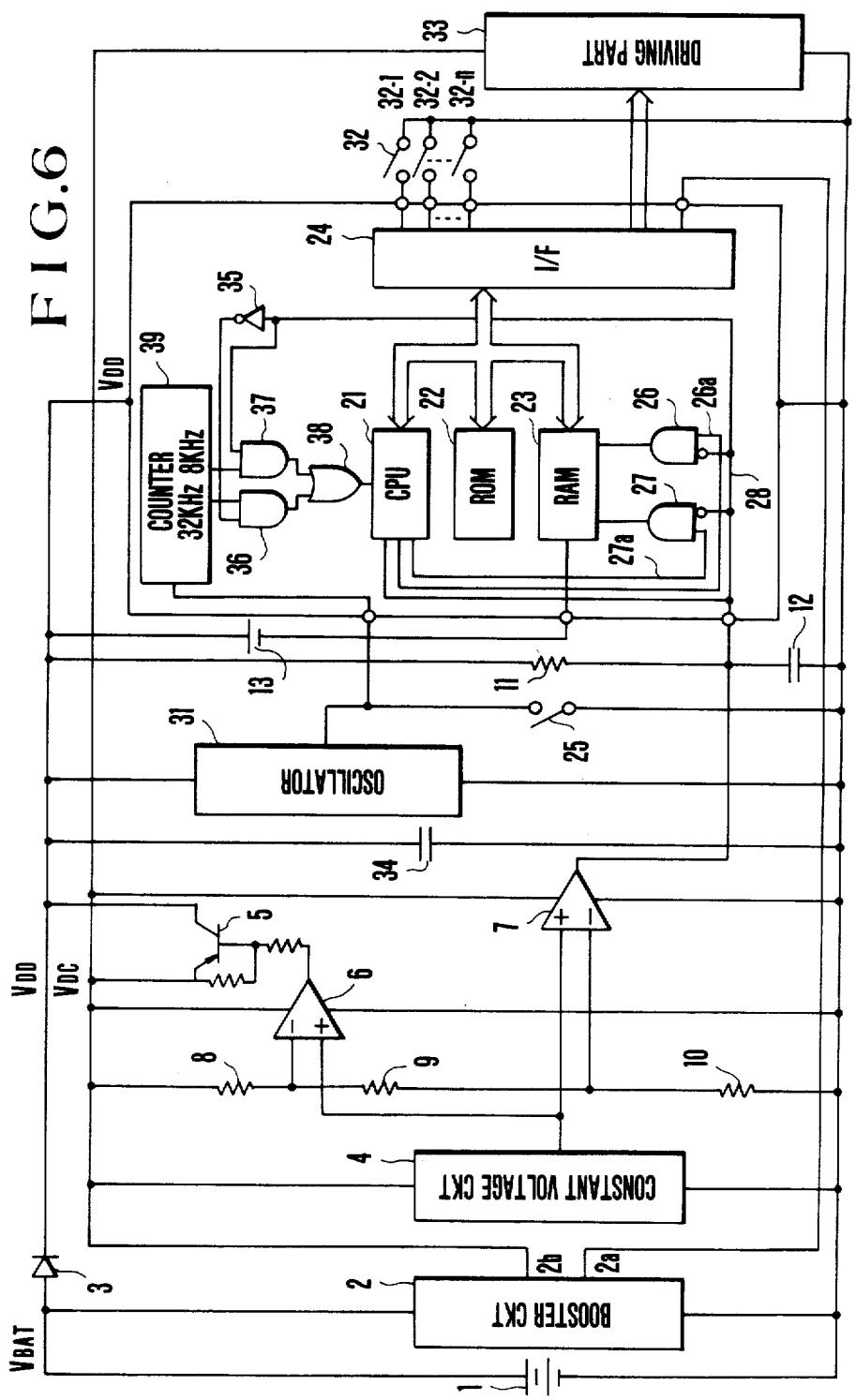
FIG. 6 is a circuit diagram showing a camera provided with a computer and arranged as another embodiment of this invention.

FIG. 6 is a circuit diagram showing a still further embodiment example of this invention. In FIG. 6, the same components as those shown in FIG. 1 are indicated by the same reference numerals. This embodiment differs from the embodiment shown in FIG. 1 in the following point: A frequency dividing counter 39 is arranged to frequency divide the output of the oscillator 31 and to produce frequency divided outputs of two different frequencies 32 KHz and 8 KHz; and a selector consisting of AND gates 36 and 37, an OR gate 38 and an inverter 35 is arranged to select one of the outputs of the counter 39. The output of 8 KHz is selected for clock pulses to be supplied to the CPU 21 when the output level of the comparator 7 is H, that is, when the output voltage of the booster circuit 2 is below a predetermined value. The other output of frequency 32 KHz is selected for the clock pulses to be the CPU 21 when the output level of the comparator 7 is L, that is, when the output voltage of the booster cirouit 2 is above the predetermined value.

Figure 7:
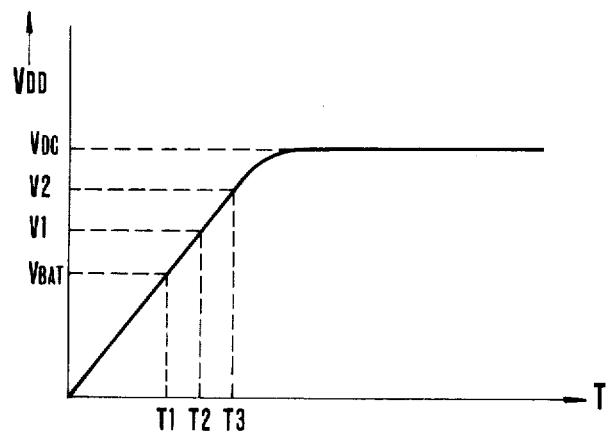
FIGS. 7, 8 and 9 are wave form charts and a flow chart showing the operation of the embodiment shown in FIG. 6.

Next, referring to FIGS. 7, 8 and 9, the embodiment which is arranged as described above and as shown in FIG. 6 operates in the following manner:

In FIG. 7, the output voltage VDC of the booster circuit 2 (DC/DC converter) is shown on the axis of ordinate and length of time T elapsed after commencement of the operation of the booster circuit 2 on the axis of abscissa. FIG. 7 thus shows the building-up transition characteristic of the booster circuit 2.

Figure 8:
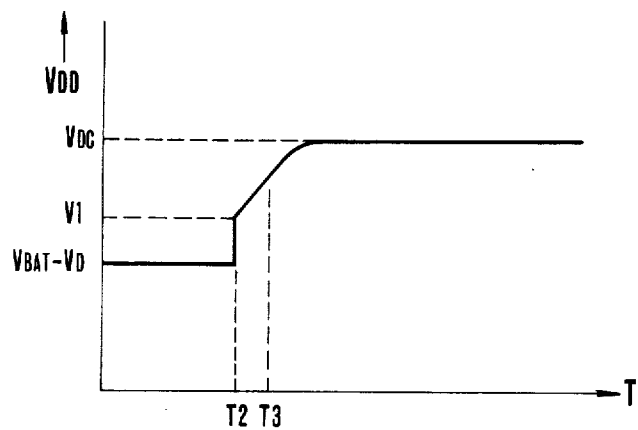
Figure 9:
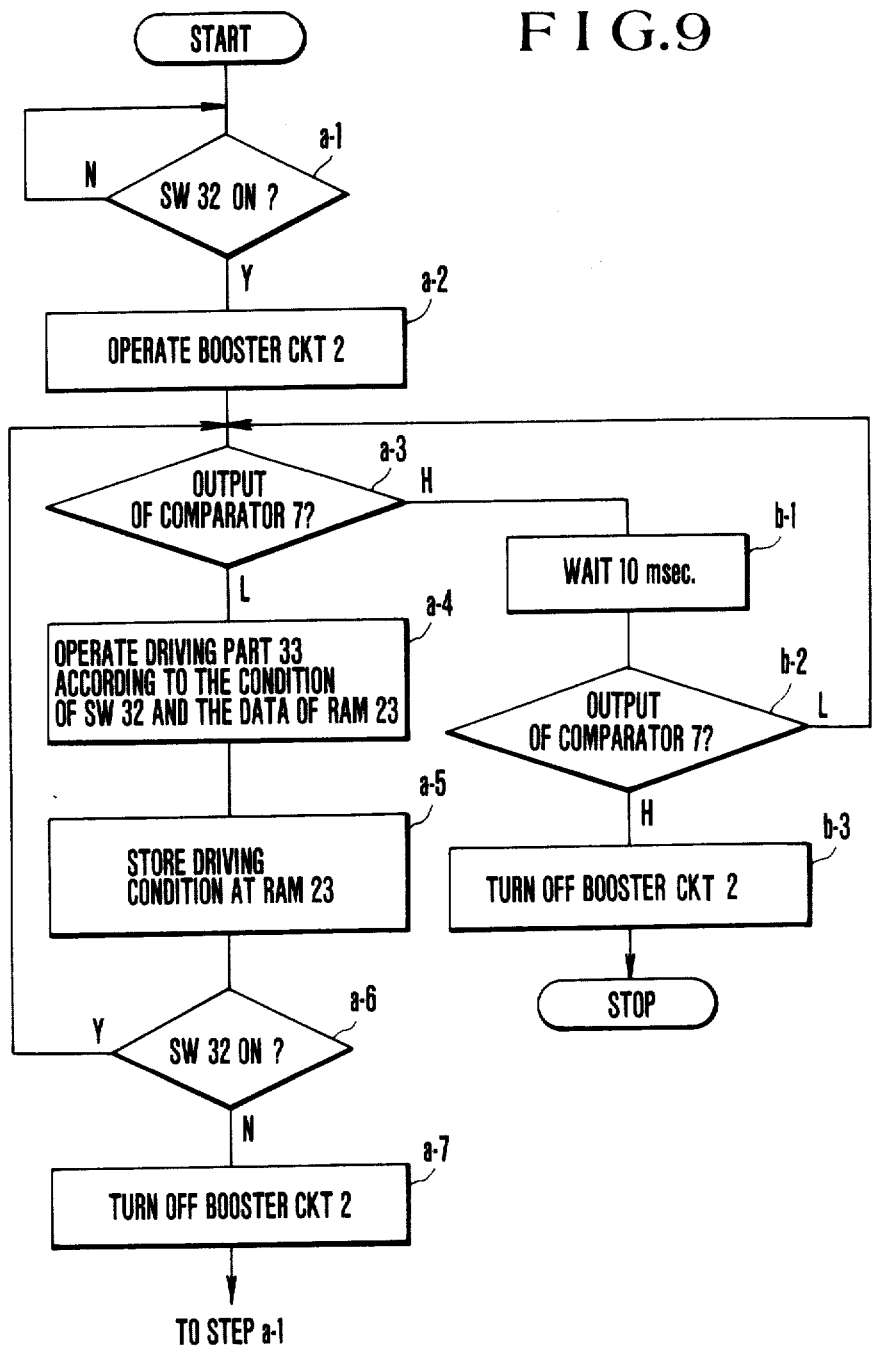

In FIG. 8, the voltage VDD which is supplied to the microcomputer 20 is shown on the axis of ordinate and the length of time T elapsed after commencement of the operation of the booster circuit 2 on the axis of abscissa. FIG. 8 thus shows variations in the voltage supplied to the microcomputer 20. FIG. 9 is a flow chart which shows the operation of the microcomputer 20.

When the power source battery 1 is set within the battery chamber which is not shown, the voltage $V_{BAT}$ of the power source battery 1 is supplied via the diode 3 to the microcomputer 20 and the oscillator 31 as shown in FIG. 8. At the same time, the reset switch 25 turns off. The oscillator 31 begins to oscillate thus generating clock pulses. The microcomputer 20 is caused to begin to operate by the clock pulses generated by the oscillator 31. Referring to FIG. 9, with the microcomputer having begun to operate, a detecting action is performed to find which of the switch group 32 provided for information writing is on at a step a-1. If any of these switches is found on, the operation proceed to a step a-2. At the step a-2, the CPU 21 of the microcomputer 20 causes the level of the terminal 2a of the booster circuit 2 to become L via the interface circuit 24 to actuate thereby the booster circuit 2. The booster circuit 2 begins to operate and produces a voltage VDC as shown in FIG. 7. The voltage of the booster circuit 2 rises with the lapse of time. When the voltage comes to reach the first level Vl by exceeding the voltage VBAT of the power source battery 1, the output level of the comparator 6 changes from H to L. Then, the transistor 5 turns on. With the transistor 5 turned on, the voltage VDD to be supplied to the microcomputer 20 is shifted from the voltage VBAT of the battery 1 to the voltage VDC of the booster circuit 2 at a point of time T2 as shown in FIGS. 7 and 8.

Following that, when the output voltage of the booster circuit 2 further increases to exceed the second level V2, the output level of the comparator 7 changes from H to L at a point of time T3 as shown in FIGS. 7 and 8. With the output level of the comparator 7 having changed from H to L, the frequency of the clock pulses supplied to the microcomputer 20 is switched over from 8 KHz to 32 KHz by a gate circuit consisting of an inverter 35, AND gates 36 and 37 and an OR gate 38. Since a high voltage is applied to the microcomputer 20 after the time point T2 of FIGS. 7 and 8, the clock pulses drive the CPU 21 as the basic frequency thereof even after the switch-over to the frequency 32 KHz.

Referring to the flow chart of FIG. 9, the microcomputer 20 operates as follows: The flow of operation proceeds to a step a-4 when the output level of the comparator 7 changes from H to L as mentioned in the foregoing. In other words, the data transfer is performed between the CPU 21 and the RAM 23 only when the power supply voltage is detected to be above a predetermined value. At the step a-4, as mentioned in the description of each of the embodiments in the foregoing, the microcomputer 20 performs its processing operation by detecting the contents of the RAM 23 and the condition of the switch group 32.

If photographing information has been set with the switch group 32 pushed in, for example, the switch group are disconnected. The operation flow then repeats a loop of steps a-3 - a-6 until completion of setting of photographing information. In case that the release switch is pushed in among the switch group 32, a quick return mirror is uplifted to allow the sequence of photographing operations to proceed. The leading curtain of the shutter travels. Then, after the lapse of a shutter time determined on the basis of the set photographing information, the trailing curtain of the shutter travels. The loop of steps a-3 - a-6 is repeated until all the switches of the switch group 32 turn off.

With all the switches of the switch group 32 having turned off, the operation flow comes to a step a-7 to turn off the booster circuit 2 and then comes back to the step a-1. Further, at the step a-3, if the output level of the comparator 7 remains at H without changing to L because of an insufficient voltage supplied to the microcomputer 20, the operation flow comes to a step b-1. At a step b-2, again the output level of the comparator 7 is checked after the lapse of 10 msec of a waiting period of the step b-1. If the output level of the comparator 7 is found L indicating that the output voltage of the booster circuit 2 has become sufficient, the operation flow comes back to the step a-3. If the output level of the comparator 7 is found still ramaining at H at that time, it indicates some abnormality of the power supply or an insufficient voltage of the power supply battery 1. In that event, the booster circuit 2 is turned off at a step b-3 to lighten the load on the battery 1. After that, the operation comes to a stop.

In the case of this embodiment, the power supply to the microcomputer 20 is switched over from the output of the power supply battery 1 to the output voltage of the booster circuit 2 only after the computer 7 detects that the output voltage of the booster circuit 2 has reached a predetermined value. After this, a further rise in the output voltage of the booster circuit 2 is detected again by the comparator 7 and the data transfer between the CPU 21 and the RAM 23 is allowed when the output voltage of the booster circuit 2 becomes higher than the predetermined value. The arrangement ensures more accurate data transfer between the CPU 21 and the RAM 23 than the method of allowing the data transfer concurrently with the switch-over of the power supply to the microcomputer 20 from the output of the power supply boltage 1 to the output of the booster circuit 2, because:

The load on the booster circuit 2 suddenly changes at the time of the switch-over of the power supply from the battery 1 to the booster circuit 2. Then, this sudden change in the load tends to cause a temporary drop in the voltage of the booster circuit down to a value below a voltage level required for the data transfer between the CPU 21 and the RAM 23. Therefore, if the data transfer between the CPU 21 and the RAM 23 is allowed at the same time as the switch-over of the power supply to the microcomputer 20 from the battery 1 to the booster circuit 2, the data transfer might be prematurely carried out between the CPU 21 and the RAM 23 while the CPU 21 and the RAM 23 are not in their normal conditions. Whereas, in accordance with the arrangement of this embodiment, the data transfer between the CPU 21 and the RAM 23 is not allowed to be effected immediately after the switch-over of the power supply to the output of the booster circuit 2 but is allowed only after the voltage of the booster circuit 2 has become higher than the above-stated predetermined value.

While the above description of this embodiment has covered by way of example only the data transfer between the CPU 21 and the RAM 23, the arrangement of the embodiment is of course likewise applicable to data transfer to be made between other memory elements.

The embodiment shown in FIG. 6, as mentioned above, is arranged to have the frequency of the operating clock pulses for the microcomputer 20 switched over to a higher frequency through the operation of the switch 32 in carrying out the data transfer or transmission between the RAM 23 and the CPU 21. Therefore, the power supply can be saved from being wasted as the computer 20 is allowed to have a low frequency and a low voltage when no data transfer is required and also data can be processed at a high speed when data transfer is necessary.

What is claimed is:

1. A camera, having a computer circuit for control over the operations of the camera, comprising:
   (a) a detection circuit for detecting a voltage applied to said computer circuit and producing an output when the voltage is below a predetermined value;
   (b) an inhibition circuit for inhibiting the operation of said computer circuit in response to the output of said detection circuit; and
   (c) a delay circuit for delaying for a predetermined period of time the inhibiting action of said inhibition circuit on the operation of said computer circuit.

2. A camera having a computer circuit for control over the operations of the camera, comprising:
   (a) a detection circuit for detecting a voltage applied to said computer circuit and producing an output when the voltage is below a predetermined value;
   (b) an inhibition circuit for inhibiting the operation of said computer circuit in response to the output of said detection circuit; and
   (c) a control circuit for causing said inhibiting action of said inhibition circuit on the operation of said computer circuit to be performed after completion of the operation of said computer circuit when the operation is in process.

3. A camera having a computer circuit for control over the operations of the camera, comprising:
   (a) a detection circuit for detecting a voltage applied to said computer circuit and producing an output when the voltage is below a predetermined value; and
   (b) an inhibition circuit for inhibiting the operation of said computer circuit in response to the output of said detection circuit, said inhibition circuit being arranged to perform said inhibiting action after completion of the operation of said computer circuit when the operation is in process.

4. A camera according to claim 1, 2 or 3, wherein said computer circuit includes a processing part for processing data and a writing memory part; and said inhibition circuit is arranged to inhibit a data writing or reading operations to or from a memory circuit.

5. A camera according to claim 1, wherein said delay circuit is arranged to allow said inhibition circuit to operate after the lapse of a predetermined period of time when the output of said detection circuit has been produced over a predetermined period of time.

6. A camera according to claim 2, wherein said control circuit is arranged to actuate said inhibition circuit when said detection circuit is in an output producing state at the end of the operation of said computer circuit.

7. A camera having a computer circuit for control over the operations of the camera, comprising:

(a) a detection circuit for detecting a voltage applied to said computer circuit and producing an output when the voltage is below a predetermined value;

(b) an inhibition circuit for inhibiting the operation of said computer circuit in response to the output of said detection circuit; and (c) an absorbing circuit for absorbing temporary generation of the output of said detection circuit and preventing thereby said inhibition circuit from responding to said temporary generation of the output of said detection circuit.

8. A camera according to claim 7, wherein said computer circuit includes a processing part for processing data and a writing memory part; and said inhibition circuit is arranged to inhibit a data writing or reading operations to or from a memory circuit.

9. A camera having a computer circuit for control over the operations of the camera, comprising:

(a) a reset circuit for resetting a computer by generating a reset signal in the event of the functional decline of a power source which is generating a voltage to be applied to said computer circuit; and (b) means for causing the computer resetting action of said reset signal to be performed after completion of the operation of said computer when said computer operation is in process.

10. A camera according to claim 9, wherein said reset circuit is arranged to operate when said power source deviates from a normal set position relative to a power source chamber.

11. A camera having a computer circuit for control over the operations of the camera, comprising:

(a) a reset circuit for resetting a computer by generating a reset signal in the event of the functional decline of a power source which is generating a voltage to be applied to said computer circuit; and (b) means for transmitting said reset signal to said computer by delaying said reset signal for a predetermined period of time.

12. A camera according to claim 11, wherein said camera includes a clock pulse generating circuit for generating clock pulses for causing said computer circuit to operate according thereto; and said generating circuit is arranged to stop applying said clock pulses to said computer circuit in response to said reset signal.

13. A camera having a computer circuit for control over the operations of the camera, comprising:

(a) a clock signal generation circuit for generating a clock signal which is applied to said computer circuit for operating said computer circuit; and (b) control circuit for causing the frequency of said clock signal applied to said computer circuit to be a first frequency when the voltage of a power source is below a predetermined value and to be another frequency higher than said first frequency when the voltage of said power source is above said predetermined value.

14. A camera having a computer circuit for control over the operations of the camera, comprising:

(a) a clock signal generation circuit for generating a clock signal which is applied to said computer circuit for operating said computer circuit; and (b) a switch arranged to operate in response to an operation member of said camera; and (c) a change-over circuit responsive to the shift of the operating condition of said switch for changing the frequency of said clock signal from a first frequency to another frequency which is higher than the first frequency when the voltage of a power source is above a predetermined voltage value.

15. A camera having a computer circuit for control over the operation of the camera, (a) a clock signal generation circuit for generating a clock signal which is supplied to said computer circuit for operating said computer circuit; and (b) an operation switch for making the computer circuit carry out a predetermined treatment, said computer circuit carrying out said treatment by the shift of the operation state of the operation switch; and (c) a change-over circuit responsive to the shift of the operating condition of said switch for changing the frequency of said clock signal to another frequency, which is higher than the first frequency.

16. A camera having a computer circuit for control over the operation of the camera, comprising:

(a) a power supply circuit for supplying an operating voltage to said computer circuit;

(b) a control circuit for causing the voltage from said power supply circuit to said computer circuit to be supplied at a different value under a condition in which data transfer between a memory circuit and a processing circuit within the computer circuit is allowed from a value at which the voltage is supplied under another condition in which said data transfer is inhibited.

17. A camera having a computer circuit for control over the operation of the camera, comprising:

(a) power supply circuit for supplying an operating voltage to said computer circuit;

(b) an operation switch for making the computer circuit carry out a predetermined treatment, said computer circuit carrying out said treatment by the shift of the operation state of the operation switch; and (c) a control circuit responsive to the shift of the operation state of the switch for changing the voltage to be applied from said power supply circuit to the computer circuit from a first voltage to a second voltage higher than the first voltage.

18. A camera having a computer circuit for controlling the operation of the camera, comprising:

(a) a power source circuit for producing a voltage to be supplied to the computer circuit;

(b) a detecting circuit for detecting the voltage of said power source circuit so as to produce an output when the detected voltage is below a certain predetermined value;

(c) an inhibiting circuit for inhibiting the operation of said computer circuit in response to the output of said detection circuit; and (d) a delay circuit for delaying for a predetermined period of time the inhibiting action of said inhibition circuit on the operation of said computer circuit.

19. A camera having a computer circuit for control over the operation of the camera, comprising:

(a) a power source circuit for producing a voltage to be supplied to the computer circuit;

(b) a detecting circuit for detecting the voltage of said power source circuit so as to produce an output when the detected voltage is below a certain predetermined value;

(c) an inhibiting circuit for inhibiting the operation of said computer circuit in response to the output of said detection circuit; and (d) a control circuit for carrying said inhibiting action of said inhibition circuit on the operation of said computer circuit to be performed after completion of the operation of said computer circuit when the operation is in process.

* * * * *